Patented Nov. 15, 1949

2,487,931

UNITED STATES PATENT OFFICE 2,487,931

EDIBLE PRODUCT AND METHOD OF
MAKING THE SAME

Harry Lataner, Vinton, Va.

No Drawing. Application May 1, 1947,
Serial No. 745,228

11 Claims. (Cl. 99—23)

The present invention relates to an edible product and to the method of making the same, and more particularly it relates to a novel food or confectionery product characterized by advantageous properties as hereinafter discussed. The present application is a continuation in part, of application Serial No. 627,283 filed November 7, 1945 now abandoned.

One object of the present invention is to provide a food, confectionery, or medicinal product containing sugar and a relatively high content of edible fat and which, in spite of the high fat content, will withstand, without melting, any temperature encountered under climatic conditions in any part of the world.

Another object is to provide a food or confectionery product which, although unaffected by dry heat, will dissolve or disperse readily in the presence of warm moisture and which is, therefore, available for eating purposes and for home and commercial use in the production of other edible products.

A further object of the invention is to provide an edible product containing a relatively high fat content and which possesses excellent keeping qualities, high nutritive value, and superior palatability.

Other objects, including the provision of a novel and commercially economical method by which the product of the invention may be produced, will be apparent from a consideration of this specification and the claims.

The product of the present invention comprises edible fat, sugar, and edible non-crystallizable powdered material, and in one of the preferred embodiments, it comprises cocoa butter, cocoa powder, and crystallizable sugar, the first two named ingredients being provided by chocolate liquor if desired. As will hereinafter be discussed, the three basic ingredients, namely, the edible fat, the sugar, and the powdered material, are present in the product in a definite and correlated relationship and the fat content is relatively high, that is at least 15% and preferably at least 25% based on the total weight of the three basic ingredients.

Heretofore, food and confectionery products of the usual type containing such amounts of edible fat and sugar have melted at temperatures encountered in the tropics and during the summer in the temperate zones, and for this reason their shipment and storage in such places or at such times have been very limited. As stated above in connection with the objects, the product of the present invention, in spite of its high fat content, does not melt at any temperature which is encountered under climatic conditions in any part of the world. In fact, the product does not melt if subject to high temperatures and eventually chars and burns without fusion. The product may, therefore, be wrapped in moisture-proof containers, such as cellophane, and shipped to any part of the world with assurance that, regardless of the heat encountered, the product will not be melted. The product possesses very desirable eating qualities, is high in nutritive value, and has excellent keeping qualities at both low and high temperatures. These advantageous properties are coupled with the additional desirable property that the product dissolves or disperses in warm moisture or water and can, therefore, be readily eaten, or dispersed in added warm water to form a palatable drink or to provide a syrup which may be utilized in bakeries, soda fountains, or for the coating or enrobing of confections wherever a chocolate coating is desired, and the like.

The product of the present invention contains the edible fat, the sugar, and the non-crystallizable powdered material in a definite and correlated relationship and, in addition, the amount of water should not exceed a maximum figure. Furthermore, the product is a co-formed mixture of the edible fat, the crystallizable sugar and the non-crystallizable powdered material, and therefore, a very intimate mixture and a thorough distribution of the three ingredients is provided in the product.

As will hereinafter appear in connection with the process, the product is formed by heating the mixture to an elevated temperature in the presence of sufficient water at the elevated temperature to dissolve at least the major portion of the sugar. The amount of water is controlled so that upon cooling to room temperature the major portion of the sugar will be crystallized. The amount of water present at the time of heating may be sufficient to dissolve the sugar at the elevated temperature, but insufficient to maintain the major portion of the sugar in solution at room temperature. However, in the preferred embodiment, an excess of water is used and removal of the excess water by evaporation during the heating and/or cooling is relied upon to reduce the amount thereof in in the mixture to the point where at least the major portion of the sugar will be crystallized at room temperature. Therefore, in accordance with the invention, crystals of sugar are formed in the presence of the edible fat and powdered material and the term "co-formed" describes such a product. These conditions must be observed in order to obtain a product of the desirable properties described above. It will therefore be seen that the product comprises, in addition to the edible fat and non-crystallizable powdered material, sugar crystallized in the presence of the other two materials. A study of the products of the present invention indicates that the ingredients, or at least a portion thereof, exist as a gel or new compound made up of some or all of the ingredients in contradistinction to the previously available chocolate products. While the invention is not to be limited to any particular theory, it is believed that this difference in the combination of the ingredients of the product accounts for the difference in the properties of the product of the present invention as compared to the properties of prior chocolate products.

Referring to the relationship between the three basic ingredients, based on the combined weight of the three basic ingredients, the fat is present in an amount between 15% and 38%; the sugar, at least a major portion of which is sugar crystallized in the presence of the edible fat and edible non-crystallizable powdered material, is present in an amount between 35% and 70%; the ratio of sugar to fat is greater than 1 to 1; the total of the fat and sugar does not exceed 95%; and the balance of the total of the three basic ingredients is made up of the non-crystallizable powdered material. In the preferred embodiment, the amount of water in the food product will be controlled so that substantially all of the sugar will be sugar crystallized in the presence of the other two basic ingredients. Advantageously, the fat is present in an amount between 25% and 35%; the sugar is present in an amount between 40% and 60%; the ratio of sugar to fat is above 7 to 5; the total of the fat and sugar does not exceed 90%; and the balance of the three basic ingredients is made up by the non-crystallizable powdered material. Referring to the ratios of sugar to fat, the ratios given, as indicated, are minima and the amount of sugar present may of course, be any amount greater than these ratios, provided it does not exceed the maximum figure of about 70%. The water content of the finished product will be sufficiently low so that at least a major portion and preferably substantially all of the sugar will be crystallized at room temperature. Generally, the amount of water will not exceed 10% of the total weight of the product and is advantageously less than 7% and may be as low as desired, although when the product contains milk powder, the water content will advantageously not be below 4%.

The edible fat may be any edible fat or oil such as cod liver oil, butter fat, lard, olive oil, cotton seed oil, peanut oil, mineral oil, and the like but since a chocolate product is particularly advantageous, the use of cocoa butter as the edible fat is preferred. However, a highly nutritious as well as palatable medicinal product may be prepared in which all or some of the edible fat is cod liver oil. Furthermore, in accordance with the present invention various mineral oil combinations may make up all or a part of the edible fat component of the product to provide highly palatable medicinal preparations. The sugar may be any one of the various crystallizable sugars, for example sucrose, maltose, dextrose, and the like. The powdered material may be any non-crystallizable edible material and is advantageously cocoa powder and/or milk powder but it may be tri-calcium phosphate, flour, starch, or the like. Obviously, various mixtures of the edible fats, of the sugars, and of the powdered materials may be used, if desired.

Where a chocolate product is desirable, the cocoa butter and the cocoa powder may be provided by a single material, namely the solid material known as "chocolate liquor" which usually contains about 52% to 54% cocoa butter, the balance being cocoa powder. When a material containing both the fat and the powdered material such as chocolate liquor or milk powder, is present, the fat in the material is considered in determining the total fat content and the ratio of fat to sugar.

In addition to the three basic materials, the composition may contain other additives such as flavoring materials, for example vanilla, peppermint, spices, and salt, coloring material, and vitamin and/or mineral concentrates.

In preparing the products of the invention, the solid ingredients and the water or milk are mixed together, sufficient water being furnished by water itself or by milk to dissolve at least the major portion of the sugar at the temperature of heating. While as stated, milk may be employed to provide the powdered material and a small amount of fat, the use of powdered milk is preferred, and hereinafter reference will be made to the addition and removal of water, although it is to be understood that milk may be used in place of or in addition to the water if desired. The mixture is then heated, preferably to at least 150° F. to dissolve at least the major portion of the sugar, and when excess water is present, to remove sufficient water so that a product containing at least the major portion of the sugar in crystalline form and having the desired low water content is obtained. A large excess of water in the mixture heated, is not objectionable except that its evaporation represents a loss of heat and time and therefore, usually about 12% to 20% water based on the other ingredients will be used in the preparation of the product with the removal of sufficient water during the heating and/or cooling to provide the co-formed mixture described, although lesser or greater amounts may be used if desired.

While various methods may be employed, the preferred practice is to mix intimately the solid ingredients in the absence of any liquid and then to add the required amount of water thereto. The mixing of the solid ingredients may be accomplished in any desired manner, for example by the use of the standard equipment available in a plant producing chocolate products. As is customary in such practice, the mixing is advantageously conducted at an elevated temperature, for example at a temperature between 110° F. and 190° F. After the mixing, the water may be added to the mass. A very desirable product for admixture with the water is obtained if the ingredients after thorough mixing are refined in accordance with standard procedure in the manufacture of sweet or sweet milk chocolate. Such refining is accomplished by passing the intimately mixed product through steel rollers which compress the mass to various degrees of fineness. such equipment being known as a refiner.

As stated, the mixture of the ingredients and water is heated usually to a temperature of at least 150° F. to dissolve at least the major portion of the sugar and to reduce the water content if necessary. When the product does not contain milk solids, the upper temperature is not critical. For example, it may be 240° F. or higher and may be above the carmelization point of the sugar. The temperature, however, will not be sufficiently high to char or render the sugar non-crystallizable. When milk powder is present, the temperature employed will not be sufficient to affect the milk powder deleteriously.

The product after the heating of the mixture as described, may be poured into forms and cooled. When a food or confection is desired, it is a good procedure to press the product while plastic and cut the product into suitable sizes or shapes or the product while still plastic may be extruded or formed in other ways. When a product which is to be converted into a syrup by the user thereof is to be prepared, it will be desirable to subdivide the solidified product and to subject the subdivided material to a further dehydration step to reduce the moisture content still further, for instance to less than 2%.

In the preferred chocolate products of the invention, the three basic ingredients are present as follows: edible fat is present in an amount between about 28% to 33%; sugar is present in an amount between about 46% to 55%; the ratio of sugar to fat is greater than about 7 to 5; the total of the fat and sugar does not exceed about 88%; and the balance of the total of the said three ingredients is the non-crystallizable powdered material. The now preferred products comprise as three basic ingredients the following: (a) cocoa butter, cocoa powder, and sugar; (b) cocoa butter, cocoa powder, whole or skimmed milk solids, and sugar; and (c) cocoa butter, whole or skimmed milk solids, and sugar; in the preferred medicinal products of the invention, i. e. where cod liver oil or mineral oil make up all or a portion of the edible fat content, the edible fat content is generally somewhat lower than the preferred amounts for the chocolate products, for example from 20% to 30%. A desirable product is obtained using cod liver oil, skimmed milk solids, or tri-calcium phosphate, and sugar. When the product contains both cocoa butter and cocoa powder, these may be furnished in whole or in part by chocolate liquor.

The following examples illustrate, but are not intended to limit in any way, the present invention.

*Example I*

100 parts of granulated sugar are poured into 100 parts of molten chocolate liquor with constant stirring. Approximately 15% based on the weight of the chocolate liquor-sugar mixture, of water is then added. The resulting mixture is continually stirred until homogeneous and heated to 215° F. until the moisture content is reduced to 10%. The temperature is gradually lowered during which time the moisture content is further reduced to 6%. The product is ground and allowed to dry until the moisture content is 2%. The resulting powder will not melt at dry elevated temperatures and may be kept over long periods without deterioration. Since it is a solid, it may be transported more easily and cheaply than the liquid syrups now available and may be readily converted into a syrup by the addition of warm or hot water. The product is particularly advantageous for use in the production of chocolate syrup for the soda fountain, bakery, or ice cream trade, or for coating or enrobing, etc. The resulting syrup readily mixes with cold liquids such as milk, water, and the like. In the production of ice cream by the use of the product, the syrup provides a higher cocoa butter content than has usually been available in products of this type and for this reason a saving of butter fat, which is usually more expensive than cocoa butter, is provided. In the use of the syrup in the coating or enrobing of confections, the usual procedure is followed except that instead of chilling the coated product as is now the practice, the coated product may be dried by any desired means, using an elevated temperature, if advantageous.

*Example II*

26 parts of cocoa butter are added with stirring to 12 parts of melted free flowing chocolate liquor. 17 parts of skimmed milk powder followed by 45 parts of sugar are added and thoroughly mixed in. The resulting mixture is stirred until homogeneous. 15%, based on the total weight of the above ingredients, of water is added to the mixture with stirring, and the mixture is heated to 200° F. and stirred until the moisture content is reduced to 10%. The temperature is gradually reduced, while stirring, until the moisture content reaches 8%. The mixture is removed from the pan and allowed to cool during which time the moisture content further decreases to 6%. The product is of the sweet chocolate type and may be cut or extruded into the desired sizes and shapes.

*Example III*

In preparing a sweet milk chocolate product, 12 parts of chocolate liquor, 45 parts of sugar, 17 parts of whole milk powder, 19 parts of cocoa butter, and 18% of water are treated as in Example II, the moisture content being reduced to below 7%.

The products of Examples II and III contain in the neighborhood of 30% fat based on the weight of the three basic ingredients; however, they will not melt or otherwise be affected when subjected to any temperature likely to be encountered in any part of the world.

*Example IV*

50 parts of cocoa butter, 48 parts of skimmed milk powder, 100 parts of sugar and 15% of water based on the combined weight of the cocoa butter, milk powder and sugar, are treated in the same manner as in Example II, the water content being reduced to less than 10%. In place of the skimmed milk powder, 40 parts of whole milk powder may be employed, in which case the fat content of the product is in the neighborhood of 30%.

*Example V*

To 25 parts of cod liver oil are added, with stirring, 25 parts of skimmed milk powder. 50 parts of sugar are then added and the resulting mass well mixed. 20 parts of water are added with stirring, and the resulting mixture is heated to 180° F. until the moisture content is reduced to 10%. The temperature of the mass is reduced to 120° F. during which time the moisture content is decreased to 6%. The material is poured and allowed to cool. The resulting product is a highly palatable medicinal food which will not melt at elevated temperatures but which is easily dispersed in warm moisture. Instead of using powdered milk, tri-calcium phosphate may make up all or a part of the non-crystallizable powdered material.

Considerable modification is possible in the composition of the products, as well as the method of producing the product, without departing from the essential features of the invention.

I claim:

1. The process of preparing a solid edible product of comparatively high fat content characterized by its ability to withstand dry heat without melting, which comprises heating a mixture of edible fat, and edible non-crystallizable powdered material, sugar, and water together, the fat being present in an amount between 15% and 38%, the sugar being present in an amount between 35% and 70%, the ratio of sugar to fat being greater than 1 to 1, the total of the fat and the sugar not exceeding 95%, the amounts being based on the combined weight of the edible fat, edible non-crystallizable material and sugar, the balance of the total of said three ingredients being said powdered material and the water content being sufficient to dissolve at least the major portion of the sugar at the temperature of heating, controlling the water content to render at least the major portion of said sugar in said product crystalline at room temperature, and solidifying said product to crystallize sugar in the presence of said fat and edible non-crystallizable material providing a co-formed mixture of crystallized sugar, fat and edible non-crystallizable material.

2. The process of preparing a solid edible product of comparatively high fat content characterized by its ability to withstand dry heat without melting, which comprises mixing together edible fat, an edible non-crystallizable powdered material, and sugar, the fat being present in an amount between 15% and 38%, the sugar being present in an amount between 35% and 70%, the ratio of sugar to fat being greater than 1 to 1, the total of the fat and the sugar not exceeding 95%, the amounts being based on the combined weight of the edible fat, edible non-crystallizable material and sugar, and the balance of the total said three ingredients being the said powdered material; mixing said mixture with sufficient water to dissolve at least the major portion of said sugar, heating said aqueous mixture to an elevated temperature to reduce the water content thereof to render at least the major portion of said sugar in said product crystalline at room temperature, and solidifying said product to crystallize sugar in the presence of said fat and edible non-crystallizable material providing a co-formed mixture of crystallized sugar, fat and edible non-crystallizable material.

3. The process of claim 2 wherein the aqueous mixture is heated to at least 150° F. and wherein the water content is reduced to less than 10%.

4. The process of claim 2 wherein the edible fat is present in an amount between 25% and 35%, wherein the sugar is present in an amount between 40% and 60%, wherein the ratio of sugar to fat is greater than 7 to 5, wherein the total of the fat and sugar does not exceed 90%, wherein the moisture content is reduced to less than 7%, and wherein at least a portion of the edible fat is cocoa butter.

5. The process of claim 2 wherein at least a portion of the edible fat is mineral oil, and wherein the water content is reduced to below 7%.

6. The process of claim 2 wherein at least a portion of the edible fat is cod liver oil, and wherein the water content is reduced to below 7%.

7. The process of claim 2 wherein at least a portion of the edible fat is cocoa butter.

8. The solid edible co-formed mixture prepared in accordance with claim 2.

9. The solid edible co-formed mixture prepared in accordance with claim 5.

10. The solid edible co-formed mixture prepared in accordance with claim 6.

11. The solid edible co-formed mixture prepared in accordance with claim 7.

HARRY LATANER.

REFERENCES CITED

The following references are of record in the file of this patent:

UNITED STATES PATENTS

| Number | Name | Date |
|---|---|---|
| 1,415,137 | Anderson | May 9, 1922 |
| 2,103,612 | Clayton | Dec. 28, 1937 |
| 2,176,086 | Logan | Oct. 17, 1939 |
| 2,188,489 | Veatch | Jan. 30, 1940 |
| 2,384,077 | Crosley | Sept. 4, 1945 |
| 2,399,195 | Bodenheim | Apr. 30, 1946 |

OTHER REFERENCES

Ser. No. 386,189, Uyrop (A. P. C.), published May 4, 1943.